(12) United States Patent
Kamil Amin et al.

(10) Patent No.: US 12,704,653 B2
(45) Date of Patent: Aug. 11, 2026

(54) SOURCE SEPARATION USING MULTISTAGE INVERSION WITH SPARSITY PROMOTING PRIORS

(71) Applicant: Schlumberger Technology Corporation, Sugar Land, TX (US)

(72) Inventors: Yousif Izzeldin Kamil Amin, Al-Khobar (SA); Rajiv Kumar, Crawley (GB); Araz Mahdad, Houston, TX (US); Massimiliano Vassallo, Crawley (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 537 days.

(21) Appl. No.: 18/259,856

(22) PCT Filed: Jan. 14, 2022

(86) PCT No.: PCT/US2022/070204
§ 371 (c)(1),
(2) Date: Jun. 29, 2023

(87) PCT Pub. No.: WO2022/155676
PCT Pub. Date: Jul. 21, 2022

(65) Prior Publication Data

US 2024/0061136 A1 Feb. 22, 2024

Related U.S. Application Data

(60) Provisional application No. 63/137,283, filed on Jan. 14, 2021.

(51) Int. Cl.

| | |
|---|---|
| ***G01V 1/34*** | (2006.01) |
| ***G01V 1/28*** | (2006.01) |
| ***G01V 1/36*** | (2006.01) |

(52) U.S. Cl.
CPC .............. *G01V 1/345* (2013.01); *G01V 1/282* (2013.01); *G01V 1/364* (2013.01)

(58) Field of Classification Search
CPC ........ G01V 1/345; G01V 1/282; G01V 1/364; G01V 2210/127; G01V 2210/20;
(Continued)

(56) References Cited

U.S. PATENT DOCUMENTS

| | | | |
|---|---|---|---|
| 10,605,941 | B2 | 3/2020 | Li |
| 11,221,426 | B2 | 1/2022 | Kumar |

(Continued)

FOREIGN PATENT DOCUMENTS

| | | | | |
|---|---|---|---|---|
| AU | 2011293660 B2 * | 9/2014 | ............ | G01V 1/284 |
| WO | WO-2016100797 A1 * | 6/2016 | ............ | G01V 1/282 |

OTHER PUBLICATIONS

Kang, Fu, Recovering signals misallocated during deblending: Toward a more robust inversion loop, Oct. 11, 2020, SEG International Exposition and Annual Meeting, Paper No. SEG-2020-3425664, pp. 61-65 (Year: 2020).*

(Continued)

*Primary Examiner* — Mi'schita' Henson
(74) *Attorney, Agent, or Firm* — Kyle R. Miiller

(57) ABSTRACT

A method includes acquiring blended seismic data representing a subsurface volume of interest from a plurality of seismic sources, estimating a signal mode using one or more first priors by applying sparse inversion to the blended seismic data, predicting multi-source interference in the blended seismic data based at least in part on the estimated signal mode, removing the estimated signal mode and the predicted multi-source interference from the blended seismic data, such that a residual signal is left, and estimating a coherent signal from the residual signal by solving a sparse inversion.

19 Claims, 11 Drawing Sheets

(58) Field of Classification Search
CPC ....... G01V 2210/614; G01V 2210/679; G01V 1/366; G01V 2210/324; G01V 1/3808; G01V 2210/25; E21B 41/00; E21B 47/13; E21B 47/14; E21B 49/00; E21B 2200/20
See application file for complete search history.

(56) References Cited

U.S. PATENT DOCUMENTS

2010/0003984 A1 1/2010 Seo
2015/0234066 A1* 8/2015 Poole .................... G01V 1/005 702/14
2016/0131781 A1* 5/2016 Sun ....................... G01V 1/306 367/7

OTHER PUBLICATIONS

Akerberg et al., "Simultaneous Source Separation by Sparse Radon Transform", SEG International Exposition and Annual Meeting, Nov. 2008, pp. 2801-2805.
Beasley et al., "A New Look at Simultaneous Sources", 68th Annual International Meeting, SEG, Expanded Abstracts, Jan. 6, 1998, pp. 133-135.
Beck, et al., "A Fast Iterative Shrinkage-Thresholding Algorithm for Linear Inverse Problems", Journal on SIAM Imaging Sciences, vol. 2, No. 1, 2009, pp. 183-202.
Berkhout A. J., "Changing the mindset in seismic data acquisition: The Leading Edge", Society of Exploration Geophysicists, vol. 27, No. 7, Jul. 2008, pp. 924-938.
Hays et al., "Blended Acquisition and Deblending Processing of 3D Ocean Bottom Node Data", EAGE Workshop on Land and Ocean Bottom-Broadband Full Azimuth Seismic Surveys, vol. 2014, No. 1, 2014, pp. 1-5.
Henin et al., "Deblending 4-Component Simultaneous-Source Data—A 2D OBC Case Study in Malaysia", SEG Technical Program, Aug. 2015, pp. 43-47.
Kumar et al., "An Inversion-based deblending solution", SEG Technical Program Expanded Abstracts 2020, Society of Exploration Geophysicists, Oct. 2020, pp. 2769-2773.
Li et al., "An Amplitude-Preserving Deblending Approach for Simultaneous Sources", Society of Exploration Geophysicists, vol. 84, No. 3, May 1, 2019, pp. V185-V196.
Mahdad A., "Deblending of Seismic Data", Doctoral Thesis, Delft University of Technology., 2012, chapters 2-4, pp. 9-77.
Mahdad et al., "Separation of Blended Data by Iterative Estimation and Subtraction of Blending Interference Noise", Geophysics, vol. 76, No. 3, May 2011, pp. Q9-Q17.
Maraschini et al., "Rank-Reduction De-Blending for Record Length Extension—the Example of the Carnarvon Basin", SEG, 2016, pp. 4628-4632.
Moore et al., "Simultaneous Source Separation using Dithered Sources", Society of Exploration Geophysicists, Jan. 15, 2008, pp. 2806-2810.
Spitz et al., "Simultaneous Source Separation: A Prediction-Subtraction Approach", Annual International Meeting, SEG, 2008, pp. 2811-2815.
Velasques, Max M.,"Seismic Deblending: Using Iterative and Compressive Sensing Methods to Quantify Blending Noise Impact on 4D Projects", In Masters Thesis, Colorado School of Mines, 2020, 133 Pages.
Xuan et al., "Deblending of OBN Ultralong-offset Simultaneous Source Acquisition", SEG International Exposition and 90th Annual Meeting, 2020, pp. 2764-2768.
Yang et al., "Seislet-based Morphological Component Analysis Using Scale-dependent Exponential Shrinkage", Journal of Applied Geophysics, vol. 118, Jul. 2015, pp. 66-74.
Mallat, S. "Sparse Representations" in A Wavelet Tour of Signal Processing: The Sparse Way, third edition, Academic Press, 2009., Chapter 1, p. 1, 12 pages total.
International Search Report and Written Opinion of International Patent Application No. PCT/US2022/070204 dated on Apr. 11, 2022; 10 Pages.
Extended European Search Report of European Patent Application No. 22740263.3 dated on Nov. 15, 2024; 13 Pages.

* cited by examiner

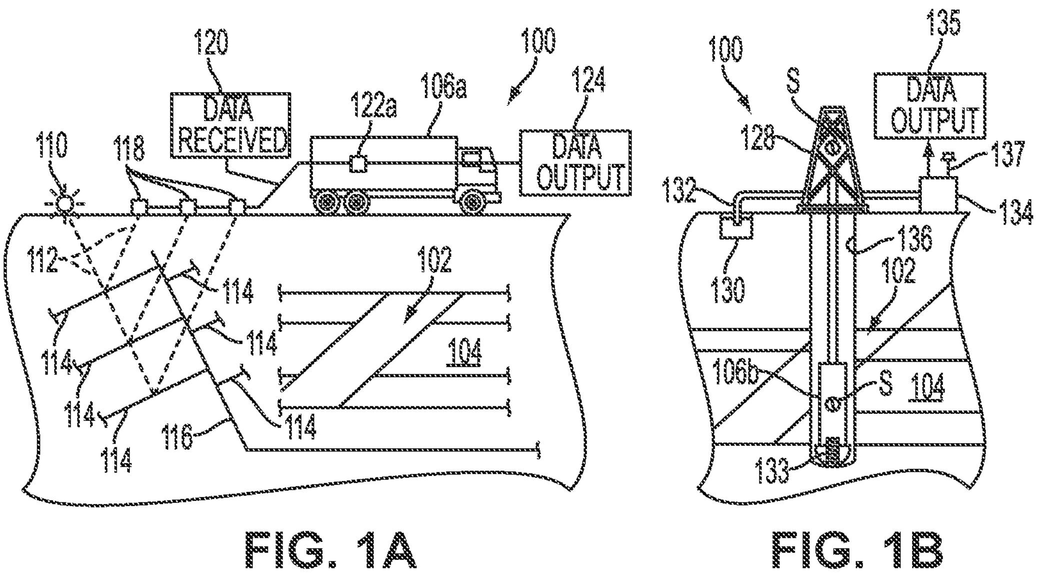
FIG. 1A
FIG. 1B
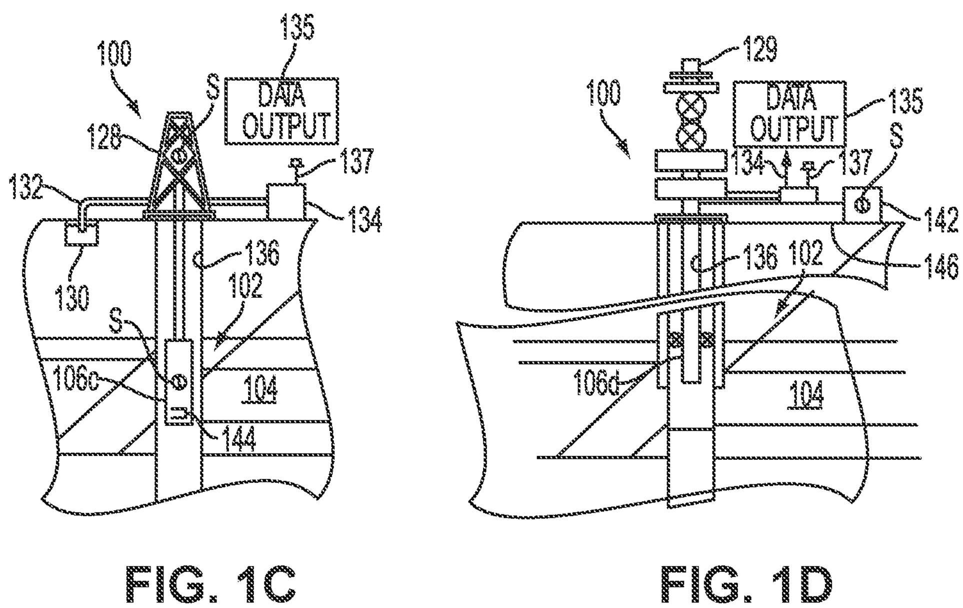
FIG. 1C
FIG. 1D

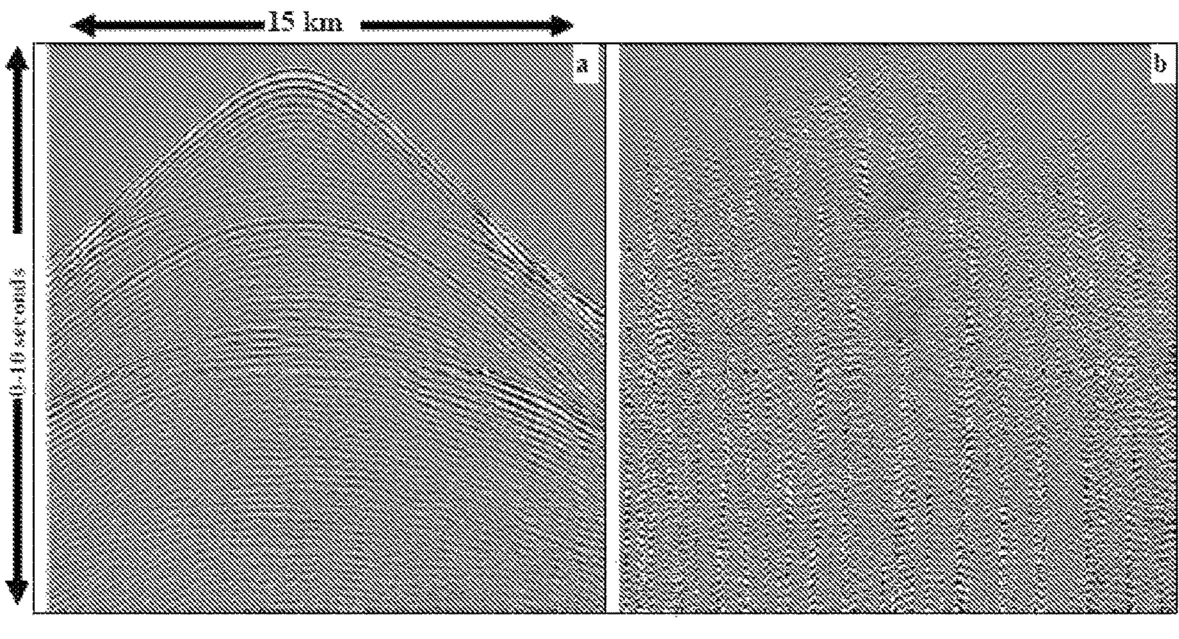
FIG. 8A
FIG. 8B
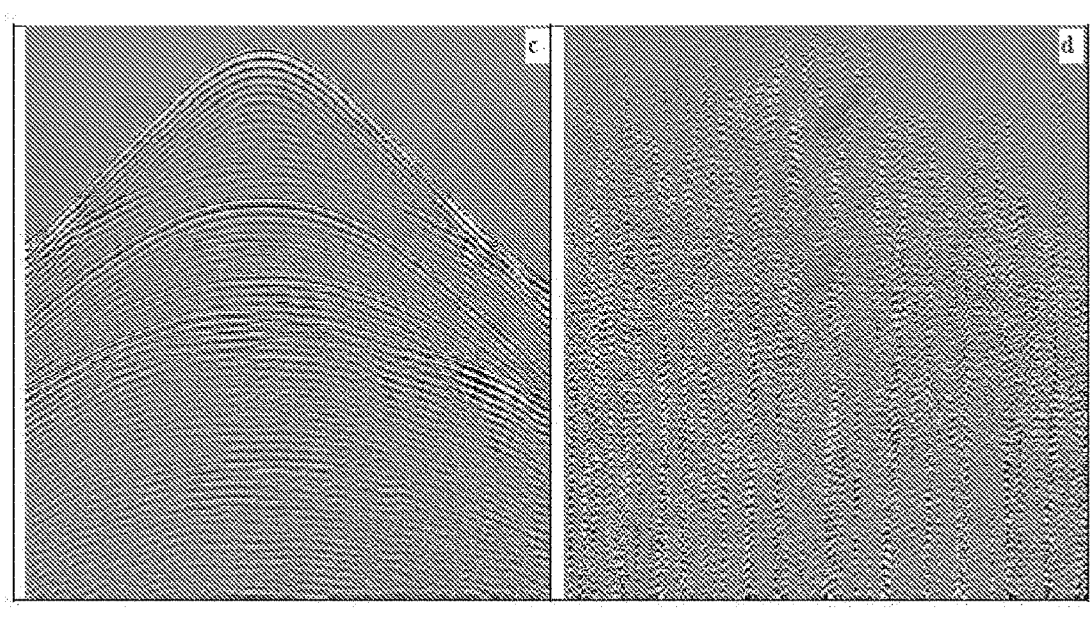
FIG. 8C
FIG. 8D

SOURCE SEPARATION USING MULTISTAGE INVERSION WITH SPARSITY PROMOTING PRIORS

CROSS-REFERENCE TO RELATED APPLICATIONS

This application is a National Stage Entry of International Application No. PCT/US2022/070204, filed Jan. 14, 2022, which claims priority to U.S. Provisional Patent Application having Ser. No. 63/137,283, which was filed on Jan. 14, 2021, and is incorporated herein by reference in its entirety.

BACKGROUND

In seismic acquisition, sufficiently long time intervals between the firing of successive sources may avoid interference in time. However, this can result in poor acquisition efficiency and coarse spatial sampling because of operational constraints. On the other hand, simultaneous source acquisition allows the responses of the seismic sources to overlap in time. This may reduce acquisition time and then create the potential for increasing spatial sampling density. However, handling source interference or crosstalk among shots, known as "blending" noise in simultaneous source acquisition, may become a challenge.

In receiver and offset domains, traces are aligned such that the time zero corresponds to the firing time of a single source. Since interfering sources may be shot at random times, the signal from that source appears coherent while interference from other interfering sources appears incoherent. Therefore, the source separation can be turned into an incoherent noise removal problem. Alternatively, source separation can be solved using inversion-based techniques that retain the coherent signal in different domains while removing the interference. These techniques may rely on imposing sparsity constraints on the desired signal in an auxiliary sparsity promoting domain to regularize the inversion problem.

The robustness of these techniques in separating the desired coherent signal from the incoherent interference noise rests upon the signal-to-blending noise ratio (SNR) at the sparsity promoting domain. From an acquisition perspective, to improve the source separation performance, the interference may be smeared and uniformly distributed in time and space. This can be achieved by reducing the number of sources firing at any point of time and making the random distribution of sources more uniform in time-dithering and the direction of arrival relative to receivers. As such, a careful design of the simultaneous source acquisition parameters may improve source separation performance.

SUMMARY

Embodiments of the disclosure include a method that includes acquiring blended seismic data representing a subsurface volume of interest from a plurality of seismic sources, estimating a signal mode using one or more first priors by applying sparse inversion to the blended seismic data, predicting multi-source interference in the blended seismic data based at least in part on the estimated signal mode, removing the estimated signal mode and the predicted multi-source interference from the blended seismic data, such that a residual signal is left, and estimating a coherent signal from the residual signal by solving a sparse inversion.

In an embodiment, the method also includes generating an image representing the subsurface volume of interest based at least in part on the estimated coherent signal.

In an embodiment, estimating the signal mode by applying the sparse inversion comprises using a sparsity inversion promoting transform that is multi-dimensional.

In an embodiment, the sparse inversion includes at least one of exploiting the sparsity or low-rank structure of seismic data.

In an embodiment, the method also includes repeating the estimating the signal mode, predicting the multi-source interference, and removing the estimated signal mode by applying one or more second priors.

In an embodiment, the one or more first priors are configured to increase a sparsity of a first signal mode, and the one or more second priors are configured to increase a sparsity of a second signal mode.

In an embodiment, the first signal mode includes a direct arrival, and wherein the second signal mode includes a reflection, refraction, a coherent noise component or a combination thereof.

In an embodiment, the seismic data includes pressure motion measurements, particle motion measurements, or both.

In an embodiment, the first set of priors includes noise attenuation, timing information of the seismic data, frequency bands in the seismic data, or a combination thereof.

In an embodiment, the first set of priors include velocity model data representing propagation characteristics through the subsurface volume.

In an embodiment, the first set of priors comprises a moveout correction, static correction, or a combination thereof.

Embodiments of the disclosure also include a computing system including one or more processors and a memory system including one or more non-transitory, computer-readable media storing instructions that, when executed by at least one of the one or more processors, cause the computing system to perform operations, the operations including acquiring blended seismic data representing a subsurface volume of interest from a plurality of seismic sources, estimating a signal mode using one or more first priors by applying sparse inversion to the blended seismic data, predicting multi-source interference in the blended seismic data based at least in part on the estimated signal mode, removing the estimated signal mode and the predicted multi-source interference from the blended seismic data, such that a residual signal is left, and estimating a coherent signal from the residual signal by solving a sparse inversion.

Embodiments of the disclosure further include a non-transitory, computer-readable medium storing instructions that, when executed by at least one processor of a computing system, cause the computing system to perform operations, the operations including acquiring blended seismic data representing a subsurface volume of interest from a plurality of seismic sources, estimating a signal mode using one or more first priors by applying sparse inversion to the blended seismic data, predicting multi-source interference in the blended seismic data based at least in part on the estimated signal mode, removing the estimated signal mode and the predicted multi-source interference from the blended seismic data, such that a residual signal is left, and estimating a coherent signal from the residual signal by solving a sparse inversion.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIGS. 5A and 5D illustrate two synthetic hyperbolic events before and after moveout correction. FIGS. 5B and 5E illustrate the associated frequency-wavenumber plot. FIGS. 5C and 5F illustrate a linear radon representation.

FIGS. 8A-8D illustrate addressing a strong-over-strong problem. More particularly, FIGS. 8A and 8B illustrate source separation using single-stage techniques without priors, and FIGS. 8C and 8D illustrate a multistage separation framework with priors.

FIGS. 9A and 9B illustrate source separation using single-stage techniques without priors, and FIGS. 9C and 9D illustrate a multistage separation framework with priors.

DESCRIPTION OF EMBODIMENTS

Figure 2:
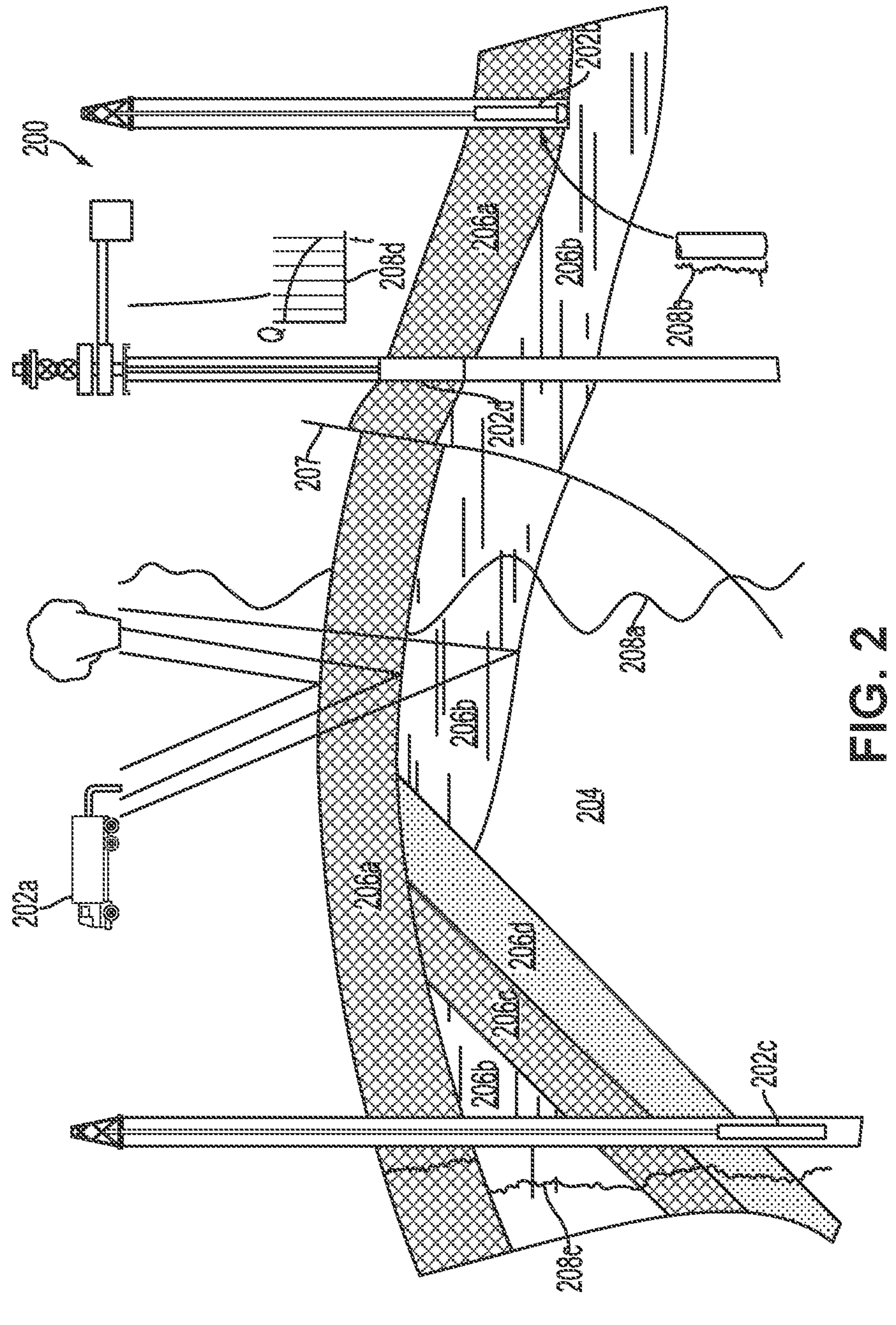

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. Although embodiments of the present method are at least partially described herein with reference to an oilfield, it will be appreciated that this is merely an illustrative example. Embodiments of the present method may be employed in any application in which visualizing, modeling, or otherwise identifying subsurface features (e.g., geological features) may be useful. Examples outside of the oilfield context include subsurface mapping for wind arrays and/or solar arrays, geothermal energy production, mining operations, offshore/deep ocean applications, etc.

Returning to the specific oilfield embodiment, FIG. 1A illustrates a survey operation being performed by a survey tool, such as seismic truck 106.*a*, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.*a* of a seismic truck 106.*a*, and responsive to the input data, computer 122.*a* generates seismic data output 124. This seismic data output may be stored, transmitted or further processed as desired, for example, by data reduction.

FIG. 1B illustrates a drilling operation being performed by drilling tools 106.*b* suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.*b* may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.*c* suspended by rig 128 and into wellbore 136 of FIG. 1B. Wireline tool 106.*c* is adapted for deployment into wellbore 136 for generating well logs, performing downhole tests and/or collecting samples. Wireline tool 106.*c* may be used to provide another method and apparatus for performing a seismic survey operation. Wireline tool 106.*c* may, for example, have an explosive, radioactive, electrical, or acoustic energy source 144 that sends and/or receives electrical signals to surrounding subterranean formations 102 and fluids therein.

Wireline tool 106.*c* may be operatively connected to, for example, geophones 118 and a computer 122.*a l of a seismic truck* 106.*a* of FIG. 1A. Wireline tool 106.*c* may also provide data to surface unit 134. Surface unit 134 may collect data generated during the wireline operation and may produce data output 135 that may be stored or transmitted. Wireline tool 106.*c* may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.*c* to measure downhole parameters which relate to, for example porosity, permeability, fluid composition and/or other parameters of the field operation.

FIG. 1D illustrates a production operation being performed by production tool 106.*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.*a*, 202.*b*, 202.*c* and 202.*d* positioned at various locations along oilfield 200 for collecting data of subterranean formation 204 in accordance with implementations of various technologies and techniques described herein. Data acquisition tools 202.*a*-202.*d* may be the same as data acquisition tools 106.*a*-106.i d of FIGS. 1A-1D, respectively, or others not depicted. As shown, data acquisition tools 202.*a*-202.*d* generate data plots or measurements 208.*a*-208.*d*, respectively. These data plots are depicted along oilfield 200 to demonstrate the data generated by the various operations.

Data plots 208.*a*-208.*c* are examples of static data plots that may be generated by data acquisition tools 202.*a*-202.*c*, respectively; however, it should be understood that data plots 208.*a*-208.*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.*a* is a seismic two-way response over a period of time. Static plot 208.*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.*c* is a logging trace that typically provides a resistivity or other measurement of the formation at various depths.

A production decline curve or graph 208.*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.*a*-206.*d*. As shown, this structure has several formations or layers, including a shale layer 206.*a*, a carbonate layer 206.*b*, a shale layer 206.*c* and a sand layer 206.*d*. A fault 207 extends through the shale layer 206.*a* and the carbonate layer 206.*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.*a* from data acquisition tool 202.*a* is used by a geophysicist to determine characteristics of the subterranean formations and features. The core data shown in static plot 208.*b* and/or log data from well log 208.*c* are typically used by a geologist to determine various characteristics of the subterranean formation. The production data from graph 208.*d* is typically used by the reservoir engineer to determine fluid flow reservoir characteristics. The data analyzed by the geologist, geophysicist and the reservoir engineer may be analyzed using modeling techniques.

Figure 3A:
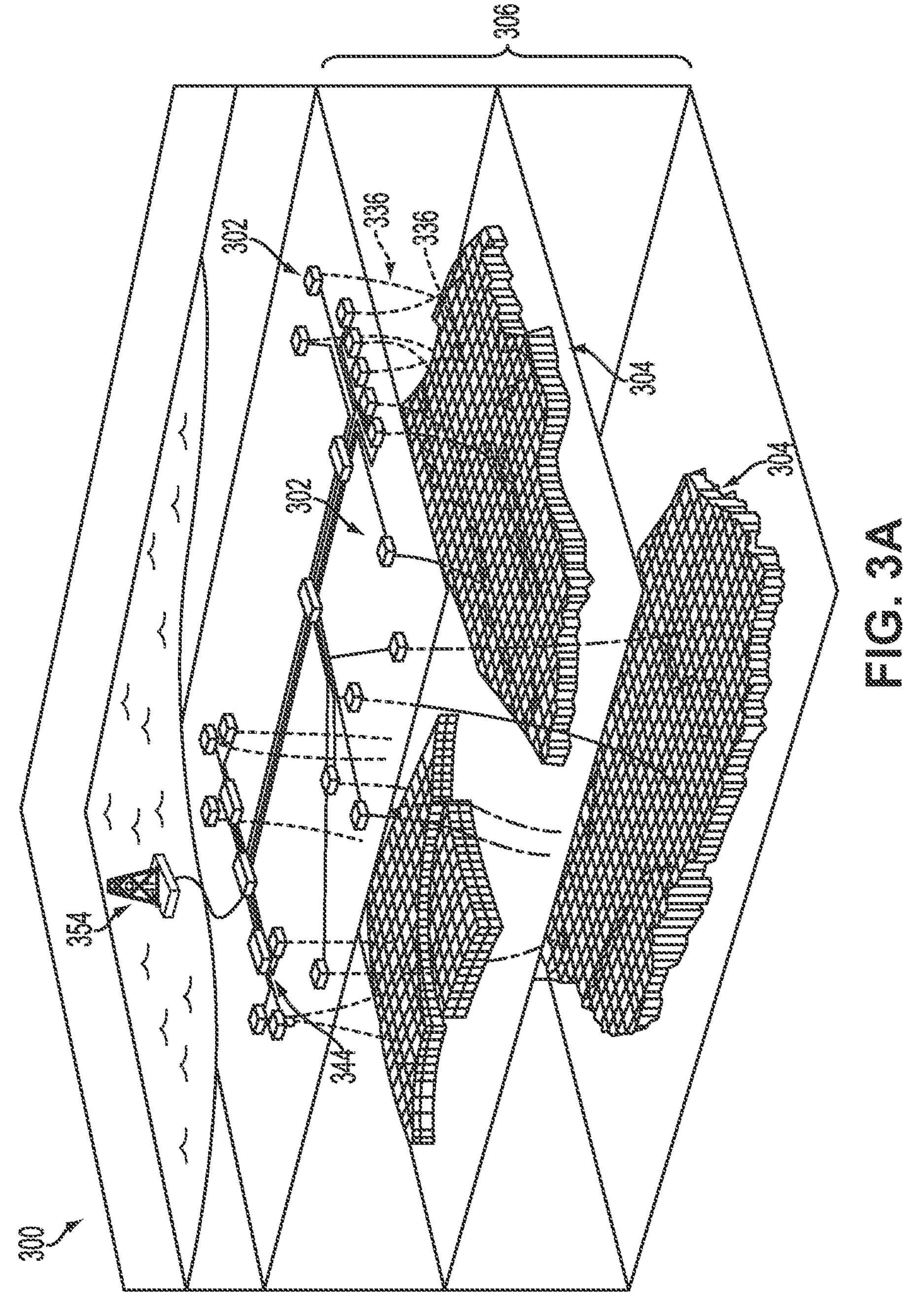

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
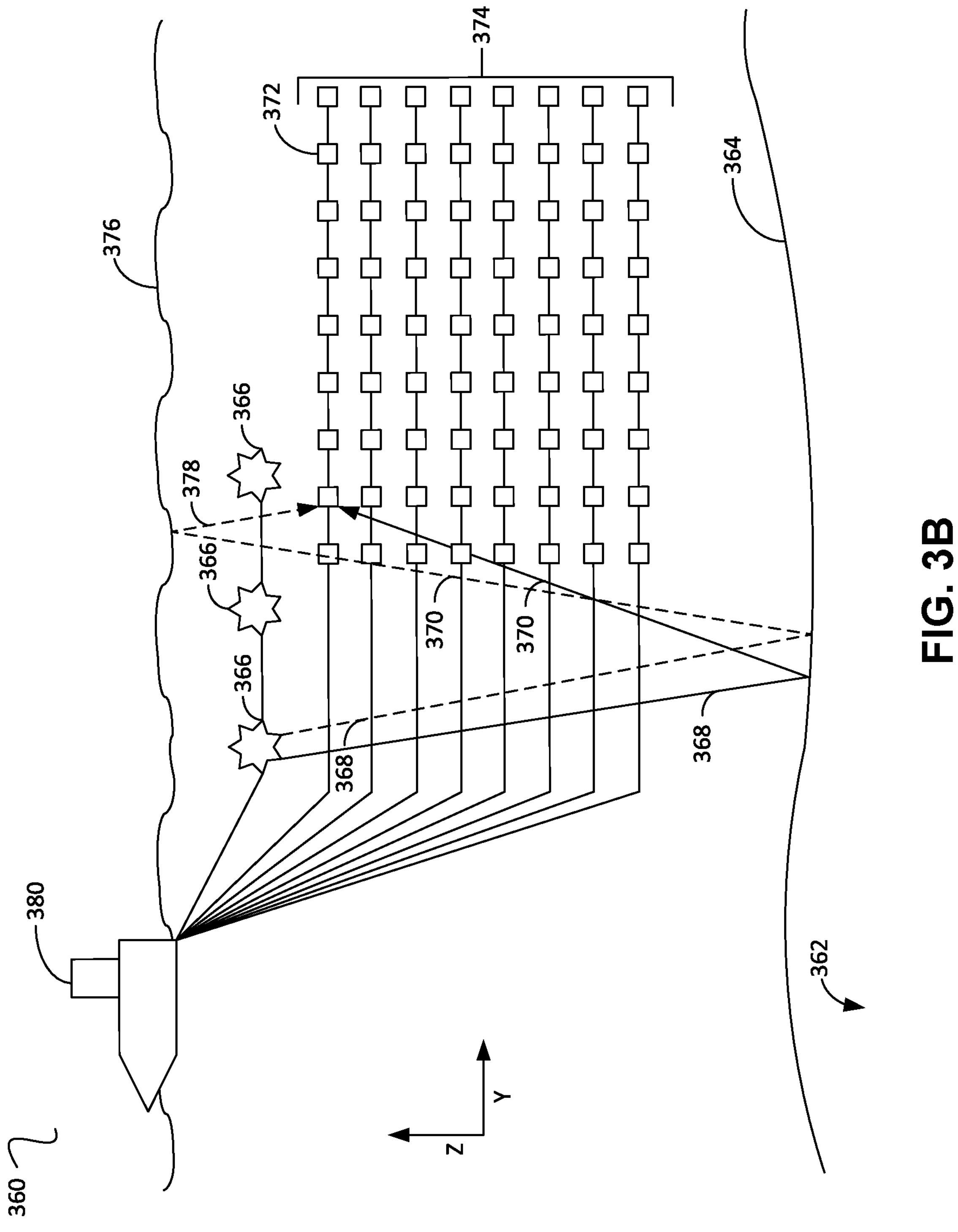

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the present disclosure may include improving the source separation performance from a processing point of view. To this end, embodiments of the present disclosure may include a multi-stage iterative source separation framework that employs "priors" (e.g., parameters selected based on a priori knowledge of the signal characteristics that facilitate extraction of the signal mode and thus "sparsity" of the remaining data) and is designed to progressively model the source separated signal while eliminating the interference in a signal-safe manner. The method adopts a multi-stage strategy where different sparsity promoting prior information are utilized to increase the signal-to-blending noise ratio (SNR). In individual stages, the method may separate different modes of seismic signals from the blended signal, starting with the strongest signal. The combination of the multi-stage strategy and the sparsity promoting priors may provide increased source separation performance.

More particularly, embodiments of the present disclosure may include a multistage prior-based source separation technique that progressively models the deblended signal while eliminating the interference in a signal-safe manner. Different sparsity promoting prior information or priors can be used at different stages to distinguish signal from blending noise, e.g., in the transform domain. In some embodiments, each stage focuses on iteratively separating one mode of the source separated signal starting with the strongest coherent mode and followed by weaker ones.

Figure 4:
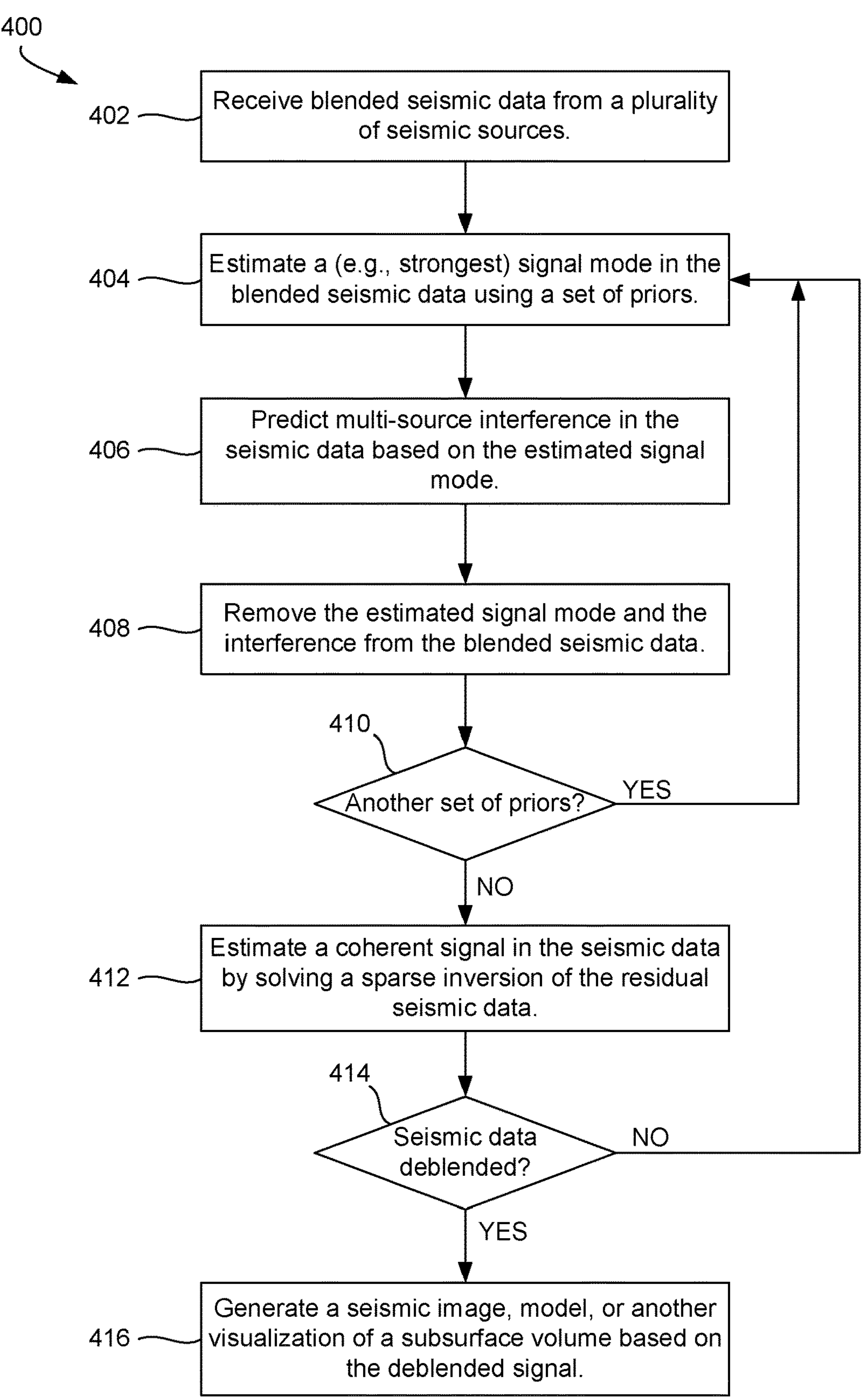
FIG. 4 illustrates a flowchart of a method for deblending seismic data and producing subsurface images and/or other visualizations therefrom, according to an embodiment.
Figure 5C:
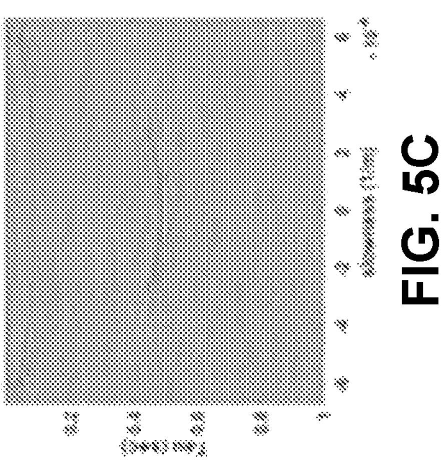
FIGS. 5A-5F illustrate seismic data. In particular.
Figure 5F:
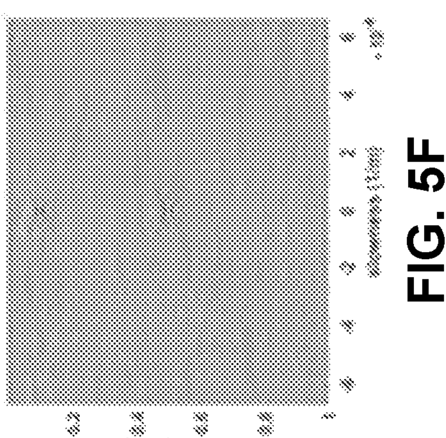
Figure 5B:
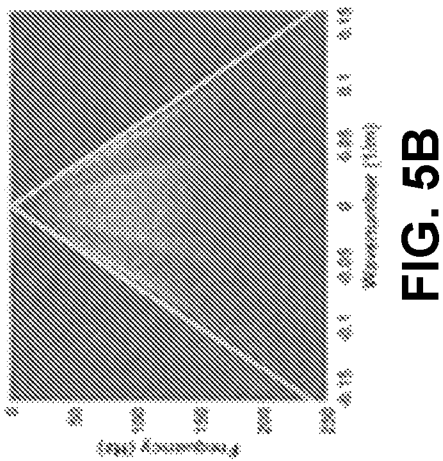
Figure 5E:
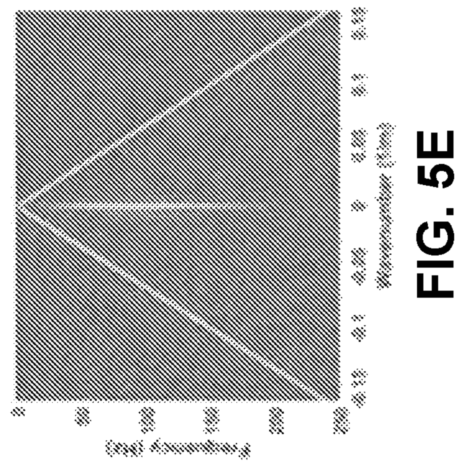
Figure 5A:
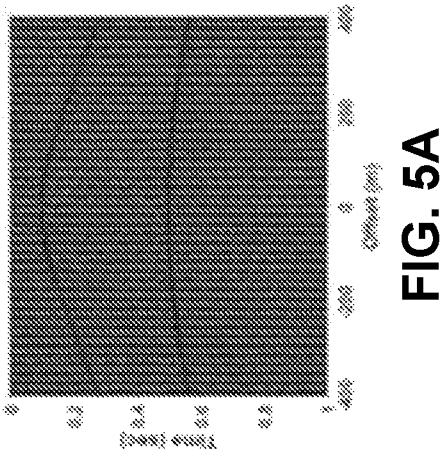
Figure 5D:
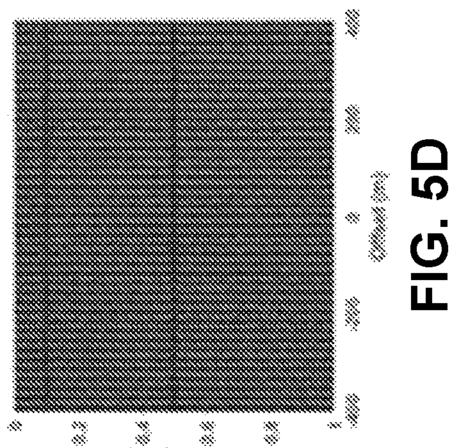

To assist in an understanding of the general workflow of at least some embodiments of this method, FIG. 4 depicts a flowchart of a method 400 for deblending multi-source seismic data and producing subsurface images and/or other visualizations therefrom, according to an embodiment. Although provided in a specific order, it will be appreciated that the worksteps in this method 400 may be performed in any other order; further, individual worksteps may be combined, partitioned, performed in parallel, or performed simultaneously, without departing from the scope of the present disclosure.

The method 400 may begin by receiving blended seismic data from (generated by) a plurality of seismic sources, as at 402. The data may be recorded by arrays of geophones, hydrophones, or other recording devices configured to receive seismic waves that propagate through a subsurface volume of interest, such that the seismic data represents the subsurface volume of interest. The seismic data that is recorded may include pressure and/or particle motion measurements.

The method 400 may enter into one or more iterative loops configured to "deblend" the multi-source seismic data. Deblending may describe a process by which one or more different coherent signals, and associated noise, are extracted from the blended data, e.g., in the context of multiple sources that create the energy recorded in the signal(s).

The first or "inner" loop may begin by estimating a (e.g., strongest) signal mode in the blended seismic data using a set of first priors and by applying a sparse inversion technique, as at 404. In at least some embodiments, the sparse inversion technique may include iterative shrinkage solvers or variants thereof. In some embodiments, the sparse inversion may stop based on the energy of the explained mode/part of the signal. Additional details for examples of such sparse inversions are provided below. In some embodiments, the sparse inversion uses a sparsity inversion promoting transform that is multi-dimensional. In some embodiments, the sparse inversion includes at least one of exploiting the sparsity or low-rank structure of seismic data.

As noted above, prior information or "priors" may be parameters that are determined based on a priori knowledge of the subsurface volume of interest. For example, velocity model information may provide the priors. Specifically, in some embodiments, static corrections and/or moveout corrections in the velocity model may be employed as priors. For example, for a given model, one type of moveout may be configured to enhance a sparsity of a particular signal mode and thus may be selected based on the a priori association between the moveout correction and its impact with respect to the signal mode of interest. In still other embodiments, the priors can include noise attenuation, timing information of the signal and interference, frequency bands in the seismic data, or the like. In some embodiments, the priors may enhance the sparsity of the signal of interest buried beneath the high-energy interference noise in the transformed domain and exhibits stronger coherency, while the interference signal becomes more incoherent.

Further, in at least some embodiments, a mute may be applied to parts of the seismic data where the mode of interest of the seismic data is known not to exist. In at least some embodiments, a mute may be applied to parts of the seismic data where the mode of interest of the seismic data does not exist, e.g., as determined based on velocity model or other characteristics.

Multi-source interference in the seismic data may then be predicted based on the estimated signal model, as at 406. The predicted estimated signal mode and the interference predicted based thereon may then be extracted, as at 408, leaving residual seismic data. This extraction may proceed, for example, using adaptive subtraction.

The inner loop may then be repeated for as many sets of priors (e.g., second priors, third priors, etc.) as are available, useful, or subjectively selected to enhance the signal, as at 410. For example, the priors may be used to iteratively select the strongest signal in the residual seismic data after the extraction of what was previously the strongest signal mode. Once one or more modes of interest are extracted from the blended seismic data, the method 400 may include estimating a coherent signal in the seismic data by solving the sparse inversion of the residual seismic data, as at 412.

The method 400 may then include evaluating whether the seismic data is sufficiently deblended, e.g., as an exit criterion to the "outer" loop, as at 414. In some embodiments, this evaluation may be based on whether additional modes are observed or expected, and thus the method 400 may loop back to 404 to detect another mode, using the same or different priors, as discussed above. This may be a subjective determination by a human user viewing the residual and/or extracted seismic signals (e.g., images). In other embodiments, a maximum number of iterations may be selected, or some other exit condition may be imposed. Further, in some embodiments, the method 400 stops automatically when the energy of the difference between the blended input data and the blending of the estimated unblended data is relatively small. In some embodiments, further signal mode modelling/estimation may be achieved without the use of priors, e.g., after estimating using the priors, as discussed above.

In at least some embodiments, the method 400 may also include using the estimated, coherent signal, once deblended, to generate one or more seismic images representing the subsurface volume of interest, as at 416. Further, such deblended signals may be employed to generate/modify a velocity model, geological model, or any other digital model representing the subsurface. Such models may be employed to facilitate planning of wells, well treatments, wind farms, solar arrays, geothermal projects, etc., based on the enhanced precision and accuracy provided by the worksteps of the present embodiments.

As noted above, different sets of priors may be configured to permit identification and extraction different signal modes from a blended signal. Accordingly, the same prior sets may or may not be reused for successive iterations of the inner and/or outer loops. For example, one set of priors may be well suited for direct arrivals, while another may be well suited for reflection/refraction events, or ground roll, mud roll, shear noise, etc. As such, different priors may be implemented in successive iterations of the loops in order to extract different signal modes and extract the different elements of the seismic data, mode-by-mode. The availability or desirability of applying additional priors may be the exit condition for the inner and/or outer loop.

In one specific, illustrative embodiment, the method 400 may implement a three-stage strategy where a linear moveout (LMO) operation is applied in the first stage to iteratively extract the direct arrival (e.g., a first signal mode). This is followed by using a non-linear moveout (NMO) to improve the sparsity of the reflection and refraction events (e.g., a second signal mode), and no moveout is used to extract other events such as diffraction energy (e.g., a third signal mode). Various different types of priors, other than LMO, NMO, and non-moveout may be employed, as these are merely one set of examples.

Considering source separation in greater mathematical detail, at least some source separation problems can be described using the following linear form:

$$b = \Gamma u + n, \tag{1}$$

where $b \in \mathbb{R}^{n_{tb} n_r \times 1}$, denotes the observed blended data in continuous form which contains all the signals recorded at $n_r$ receivers within $n_{tb}$ time samples. $\Gamma \in \mathbb{R}^{n_{tb} n_r \times n_t n_s n_r}$, denotes the blending operator containing all the timing information that describe the overlap of $n_s$ sources. $n \in \mathbb{R}^{n_{tb} n_r \times 1}$ is the background noise which may contain any signal that is not captured by the blending operation (e.g., non-cooperative interference). The challenge may be to recover $u \in \mathbb{R}^{n_t n_s n_r \times 1}$ denoting the unblended data (each trace has n t samples) in vector form that would have been recorded if there were no overlap in the sources. In some examples, $n_{tb} < n_t n_s$ in equation 1, which indicates that this is ill-posed and has infinitely many solutions. Consequently, this problem includes regularization (or prior information, in Bayesian inference terms). One way to regularize the problem of estimating u, given b, provides a constrained problem of the form:

$$\min_u \|\mathcal{S}u\|_1 \text{ subject to } \frac{1}{2}\|b - \Gamma u\|_2^2 \le \epsilon, \tag{2}$$

where $\|r\|_1$ is $\ell_1$ norm of the vector r defined as the sum of the absolute values of its elements, $\epsilon$ is the parameter which depends upon the noise variance and $\mathcal{S}$ is the analysis sparsity-promoting transform domain. This includes Fourier, linear and parabolic radon, curvelet, wavelet, and shearlet domains. For solving problems of this form, iterative shrinkage/thresholding (IST) solutions may be used. A fast iterative soft thresholding algorithm (FISTA) may also be used, where at each iteration the estimated deblended vector $\hat{u}$ may be updated as follows:

$$\hat{u}_i = \mathcal{S}^H\left(\zeta_{\lambda(\alpha_i)}\left(\mathcal{S}\left(\hat{u}_{i-1} + \alpha_i \Gamma^T(b - \Gamma \hat{u}_{i-1})\right)\right)\right), \tag{3}$$

where ζ used is the exponential shrinkage operator $\alpha_i$,λ are the step-length and thresholding values, and the symbol $(\bullet)^H$, $(\bullet)^T$ represents the matrix conjugate transpose and transpose, respectively. In at least some embodiments, thresholding value λ may be fixed across the full spectrum of data, different within a frequency band, or may vary monochromatically. Further, a thresholding schedule $\lambda(\alpha_i)$ may be fixed across the full spectrum of the data or different within a frequency band or varies monochromatically.

From equation (2), the robustness of the source separation algorithm includes finding suitable sparsity promoting domain to represent the desired unblended data u. Searching for an ideal sparsity promoting domain adapted to all signals may be avoided, especially in challenging simultaneous source acquisition scenarios where the energy of the interference is orders of magnitude stronger than the desired reflected energy causing inevitable degradation in the sparse inversion performance. Therefore, instead of assuming that the unblended signal is naturally sparse in the sparsity-promoting domain, various sets of prior information may be imposed to enhance the sparsity of the data. As such the constrained minimization in equation (2) can be written as:

$$\min_u \sum_{n=1}^{N} \eta_n \|\mathcal{S}\mathcal{P}_n u\|_1 \text{ subject to } \frac{1}{2}\|b - \Gamma u\|_2^2 \leq \epsilon, \tag{4}$$

where $$\{\mathcal{P}_n\}_{n=1}^{N}$$

encompass various sets of prior information, that enhances the sparsity of the signal in the transformed domain $\mathcal{S}$ and $\eta_n$, is the parameter balancing the different sparsity-promoting priors.

As noted above, one example of prior information that can be incorporated is moveout correction. Moveout correction can be used to reduce the curvature of seismic events and enforce sparsity in the transform domain while the interference noise remains uncorrelated. Another set of priors that may be employed may include frequency band segments. For example, the signals may have different characteristics, or be more likely to be one mode rather than another mode of coherent signal, within one frequency band than in others. Accordingly, a "prior" may refer to a specific frequency band separated from the others, upon which the analysis may proceed.

a presented to provide a better understanding of the example embodiments. FIGS. 5A-5F show two hyperbolic events with additive noise. These events are not sparse in the frequency-wavenumber or the linear radon domains. Applying moveout correction with different velocities can improve the sparsity of these events in these domains and make it easier to distinguish the signal from the background noise. In some embodiments, to solve equation (4), a simple N-stages strategy can be used, where each stage (j) solves for a specific signal mode and ignores other, less energetic modes ($\eta_j$=1; $\eta_n$=0, ∀n≠j). To be able to improve the coherency in that mode and remove all associated interference, a moveout correction $\mathcal{P}_j$ may be applied to flatten associated mode events. The estimated deblended data û can be updated in each iteration in the jth stage as:

$$\hat{u}_i^j = \mathcal{P}_j^\dagger \mathcal{S}^H\left(\zeta_{\lambda(\alpha_i)}\left(\mathcal{S}\mathcal{P}_j\left(\hat{u}_{i-1}^j + \alpha_i \Gamma^T\left(b^{j-1} - \Gamma\hat{u}_{i-1}\right)\right)\right)\right), \tag{5}$$

where $$\mathcal{P}_j, \mathcal{P}_j^\dagger$$

denote the forward and inverse moveout correction. After each stage, the estimated deblended data $\hat{u}^j$ is blended and subtracted from the residual of the previous stage $b^{j-1}$:

$$b^j = b^{j-1} - \Gamma\hat{u}^j. \tag{6}$$

This process makes the inversion more favourable for weaker events and improves the quality of the source separation. An arbitrary number of stages can be applied with different moveout corrections targeting different signal modes to improve the deblending performance.

Examples include scenario outlined in the example below, a three-stage strategy is implemented. In the first stage, a linear moveout (LMO) correction is used to enhance the sparsity of the direct arrival signal $\hat{u}^1$ and remove the associated interference. In the second stage, normal moveout correction (NMO) is applied to reduce the curvature of the reflection and refraction events and hence improve their estimation $\hat{u}^2$. This is followed by the final stage where no moveout correction is used to deal with weaker seismic events that does not obey any *a priori* known moveout characteristics, such as diffraction energy $\hat{u}^3$. Since the moveout characteristics of the signal at the first two stages are known, we can derive the ϵ value to automatically find the stopping criteria in intermediate stages while solving equation (4). The final deblending estimate can be obtained by summing all the $\hat{u}^j$ estimates.

Figure 6A:
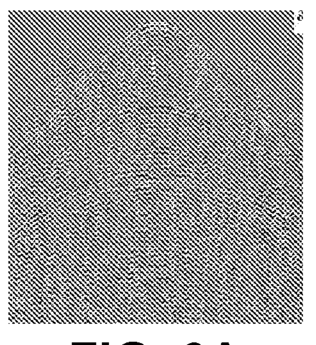
FIG. 6A illustrates an input blended common node gather section.
Figure 6B:
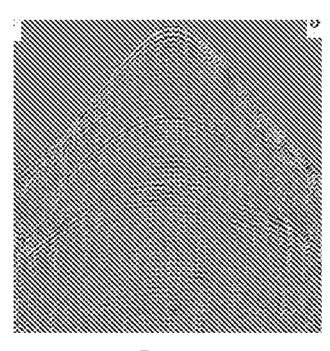
FIG. 6B illustrates a deblended section using conventional deblending.
Figure 6C:
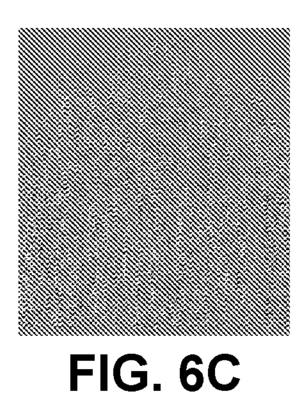
FIG. 6C illustrates a difference between FIGS. 6A and 6B.
Figure 6D:
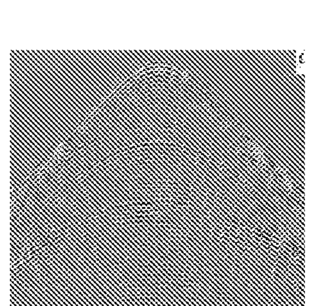
FIG. 6D illustrates a deblending using a single stage linear moveout (LMO).
Figure 6E:
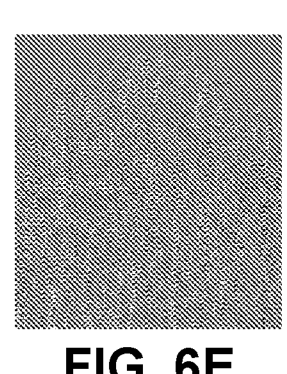
FIG. 6E illustrates a difference between FIGS. 6A and 6D.
Figure 6F:
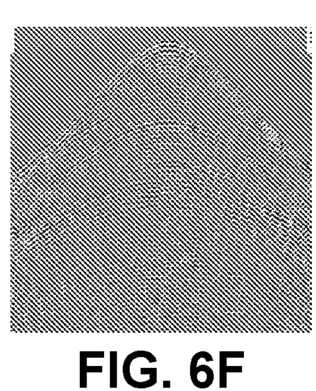
FIG. 6F illustrates a deblending using two stages: LMO followed by no moveout.
Figure 6G:
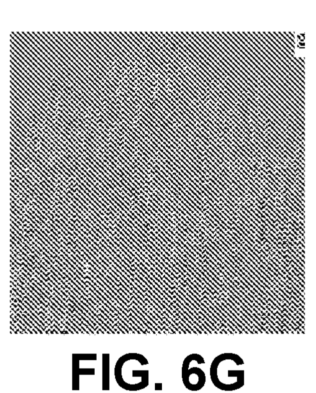
FIG. 6G illustrates a difference between FIGS. 6A and 6F.
Figure 6H:
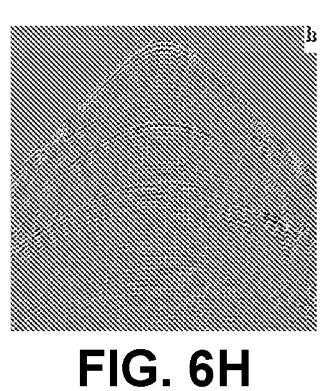
FIG. 6H illustrates a deblending using an embodiment of the present disclosure.
Figure 6I:
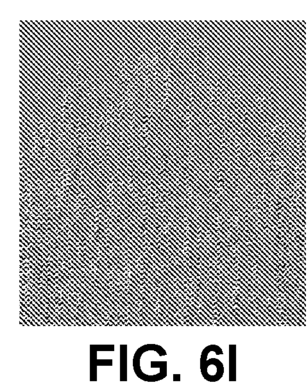
FIG. 6I illustrates a difference between FIGS. 6A and 6H.

An experimental embodiment of the present disclosure was evaluated in a node gather from an OBN survey, as shown in FIG. 6A. The nodes are sparsely deployed in a staggered grid of 1 km by 1 km, while the sources are acquired simultaneously in a 50 m by 100 m sampling steps using a dual source, triple vessels shooting. Each source fired every 20 seconds approximately and the dual source on each vessel fired simultaneously with a random dither of ±1 second. The performance of conventional deblending that solves equation 1 in a single stage with no prior information (FIG. 6B) with different variants of one embodiment may be compared. FIG. 6D shows the result of a single stage inversion that uses LMO to flatten the direct arrival. FIG. 6F shows the result of two stage inversion that uses LMO followed by no moveout. FIG. 6H shows the result of the proposed three stages approach. We can see that from the result that using prior information significantly improve the deblending performance. It is also clear that applying prior information (FIGS. 6D, 6F, and 6H) can improve the deblending performance over the conventional deblending (FIG. 6C). It can also be seen that the proposed three-stage approach, with its ability to improve the coherency of each mode, outperforms all other variants and is able to separate the sources while preserving the strong and weak signal as illustrated by the difference views (FIGS. 6C, 6E, 6G, and 6I) which show different levels of leakage of strong and weak coherent energy.

The nature of the shooting strategies causes strong interference noise either to overlay on top of the strongest event (strong-over-strong) in the seismic data such as direct arrivals or to overlay on top of the weak events (strong-over-weak) such as reflection energy appears in the deeper time sections. Moreover, the randomized shooting strategy controls how randomly and well distributed the interference noise is as compared to the coherent signal of interest.

Figures 7A, 7B:
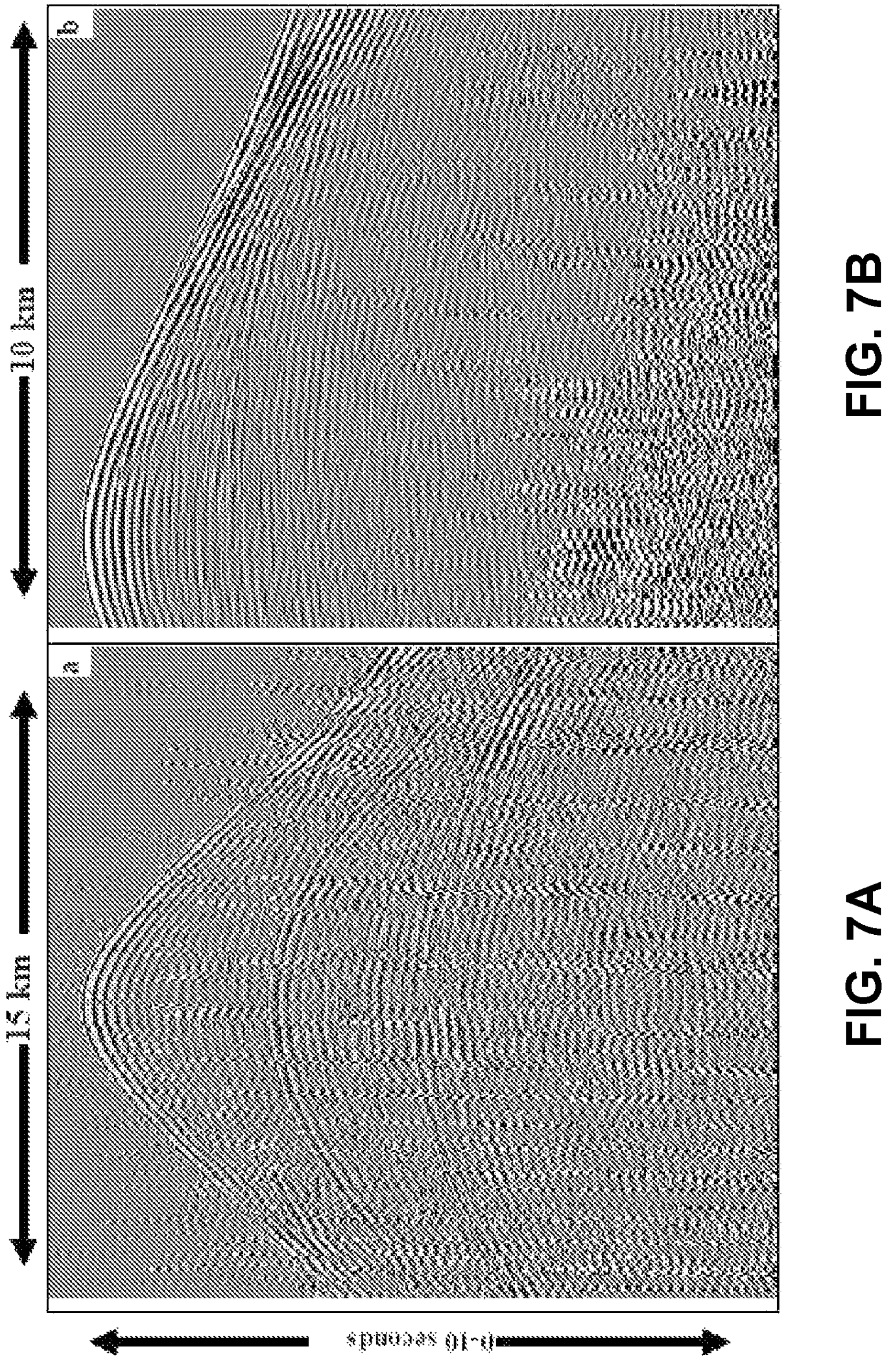
FIGS. 7A and 7B illustrate a subsection extracted from a common receiver gather from two different randomized shooting scenarios. Due to the randomization in the shooting strategy, a result is either strong-over-strong (FIG. 7A) or strong-over-weak (FIG. 7B) phenomenon, which may impact the quality of source separation using coherency based sparsity promoting deblending frameworks.

FIGS. 7A and 7B show two different blended datasets acquired in ocean bottom node (OBN) environment using different randomized shooting strategies, which exhibits strong-over-strong and strong-over-weak phenomenon, respectively. The strong-over-strong, weak-over-weak, strong-over-weak, and the coherent self-interference nature of the blending noise determines how challenging the source separation problem is, especially when the separation framework solely relies upon the coherency criteria. In particular, for the strong-over-weak scenario, the dynamic range of the interference noise is very high compared to the signal, thus the well-spread strong interference in the transformed domain remains stronger than the signal and makes the signal unperceivable. Therefore, the likelihood of picking the wrong coherent noise component instead of the weak signal buried beneath it at very early iterations of the source separation process is highly likely. Even if the signal is recognizable in the sparsity-promoting domain, its coefficients in the transform domain are still damaged in amplitude and phase by spread components of the random interference. This may challenge the coherency-based source-separation process and its ability to preserve the weak coherent signal with a satisfactory signal-to-noise ratio. Note that the problem of strong-over-strong or strong-over-weak exists in any acquisition environment be it land, marine, or OBN.

Source separation relies on the identification of the sparse coefficients of the signal and the incoherent noise in an auxiliary sparsity promoting domain. This becomes even more challenging problem for the standard source separation framework when the acquisition design is not optimal. To mitigate the shortcoming of the acquisition design, embodiments of the present method, including a multistage iterative source separation with priors (MS-ISSP) technique, are provided. The method may include combining information about the wavefield propagation with a sparsity-promoting transform domain such that the signal of interest buried beneath the high-energy interference noise gets a sparser representation in the transformed domain and exhibits stronger coherency, while the interference signal becomes more incoherent and random. One component of the method may be to solve equation (4) using a multistage with prior strategy, where the multistage aspect permits progressively modelling the different modes of seismic signal at different stages of the deblending (e.g., starting with the strongest signal mode), generating different levels and/or amplitudes of interference noise.

Furthermore, incorporating various techniques based on the nature of seismic wavefields such as moveout enhances the sparsity of the signal in the transform domain. Thus, the multistage with prior framework includes iteratively separating one mode of the source separated signal starting with the strongest coherent mode and followed by weaker ones where different sets of prior techniques are used to enhance the sparsity of coherent seismic signal in the transform domain while making interference noise more randomly distributed. Embodiments of the present disclosure may preserve the strong and weak coherent seismic signal when the randomized shooting strategies results in strong-over-weak and strong-over-strong phenomenon.

It will be appreciated that embodiments of the present disclosure may be used in a wide range of acquisition scenarios and environments (e.g., land, marine and ocean bottom nodes). In these environments, different prior information can be used to improve the signal-to interference ratio for particular types of events.

Apart from sparsity promoting transform domain, the multistage strategy with prior can be used to exploit other properties of the seismic data such as low-rank while performing the source separation. Embodiments of the disclosure can also become a part of the joint seismic processing framework where deblending, interpolation, denoising, deghosting, and multidimensional deconvolution can be performed simultaneously. In some embodiments, rank minimization can be employed to exploit the transform structure.

Figures 9A, 9B:
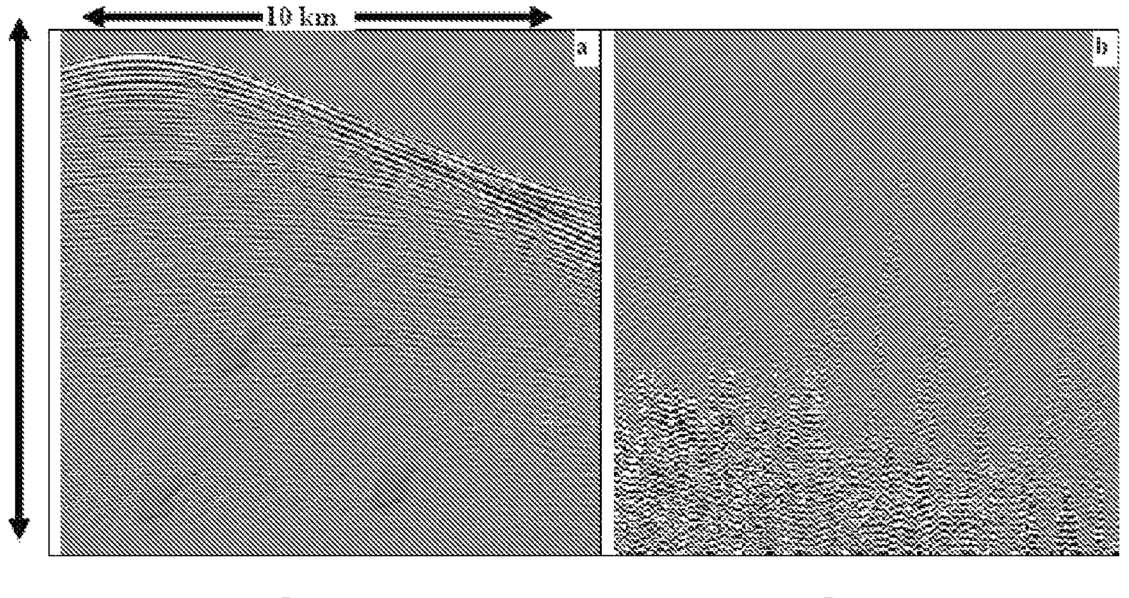
FIGS. 9A-9D illustrate addressing a strong-over-weak problem. More particularly.
Figures 9C, 9D:
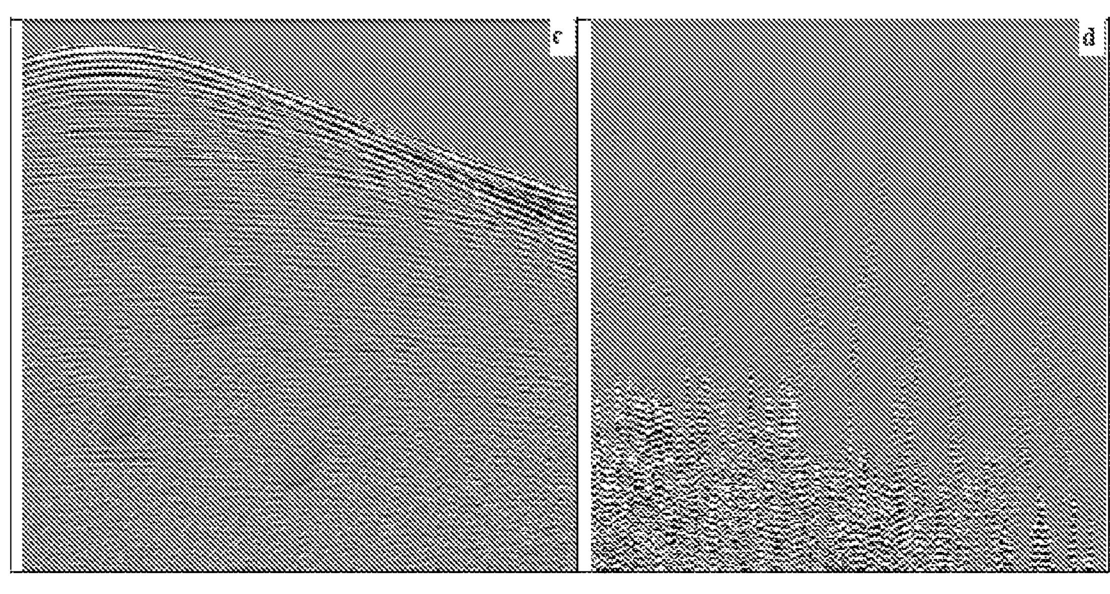

In some embodiments, specially designed priors within each stage of the multistage deblending process to improve the source separation capabilities. A specific set of priors may be used based upon the nature of seismic wavefields, which enhances the sparsity of the coherent signal in the transform domain. The various prior information at each stage in the multistage process allows any sparsity based iterative framework to pick the right coefficients of the coherent signal corrupted by the spread component of the interference noise, thus, producing the enhanced source separation results using the coherency-based sparsity promotion technique Embodiments of the present disclosure provide a deblending technology that can mitigate the impact of strong-over-weak and/or strong-over-strong interference noise occurring due to the shortcomings in the survey design. This protects the seismic signal especially the weak signal buried beneath the strong interference noise over the full spectrum of interest. In particular, FIGS. 8A-8D illustrate addressing a strong-over-strong problem, in which FIGS. 8A and 8B illustrate source separation using single-stage techniques without priors, and FIGS. 8C and 8D illustrate a multistage separation framework with priors. Similarly, FIGS. 9A-9D illustrate addressing a strong-over-weak problem. More particularly, FIGS. 9A and 9B illustrate source separation using single-stage techniques without priors, and FIGS. 9C and 9D illustrate a multistage separation framework with priors.

Embodiments of the present disclosure provide a robust tool for addressing the shortcoming of the acquisition design where the standard deblending framework may not distinguish between weak coherent signal and the strong incoherent noise, thus attenuating the weak coherent energy and producing the sub-optimal results. The proposed advanced source separation technology can prevent the loss of strong and weak coherent energy buried beneath the strong interference noise, thus, producing the optimal deblending results.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 10:
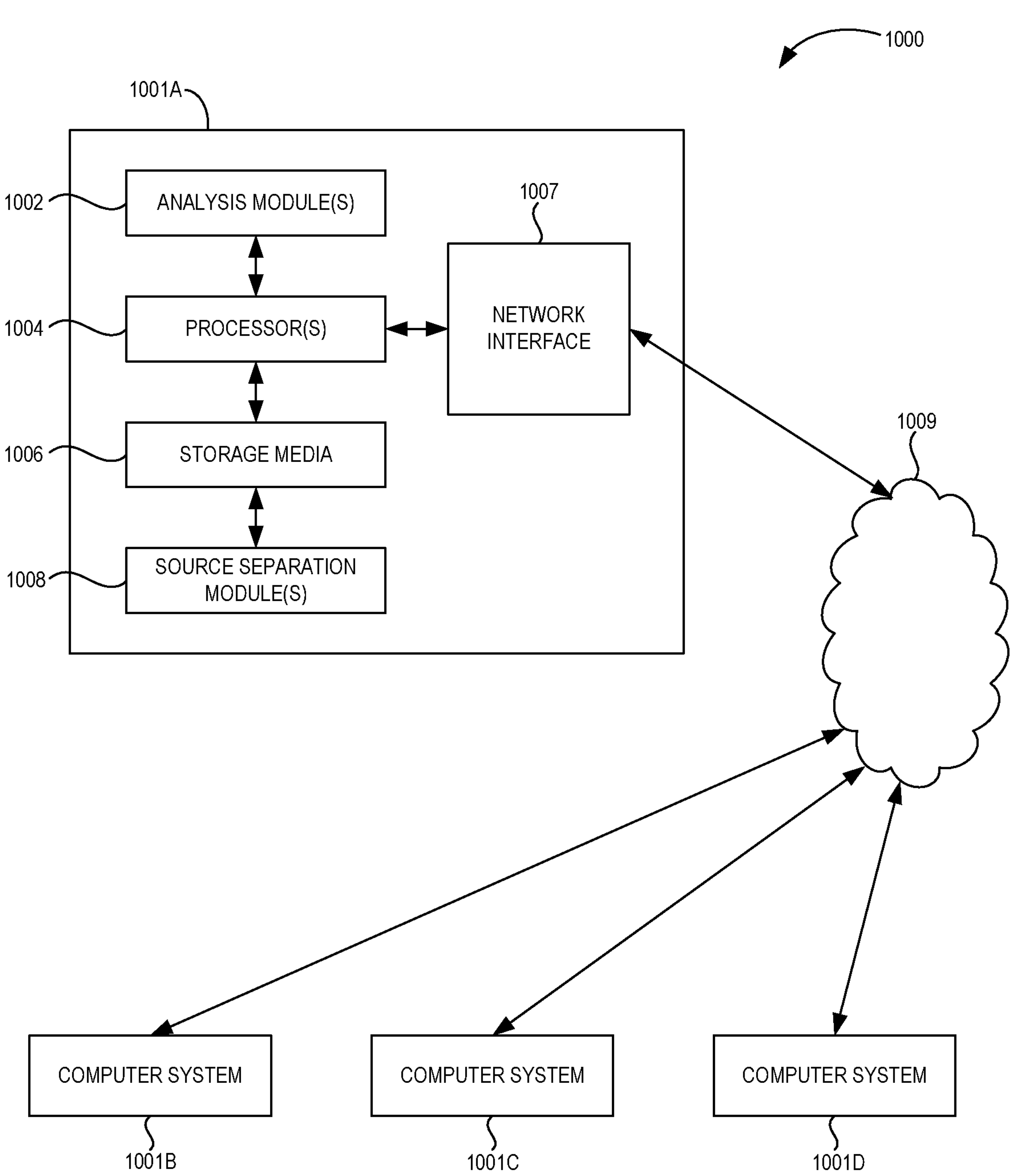
FIG. 10 illustrates a schematic view of a computing system, according to an embodiment.

In some embodiments, any of the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more source separation module(s) 1008. In the example of computing system 1000, computer system 1001A includes the source separation module 1008. In some embodiments, a single source separation module may be used to perform some or all aspects of one or more embodiments of the methods. In alternate embodiments, a plurality of source separation modules may be used to perform some or all aspects of methods.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

acquiring blended seismic data representing a subsurface volume of interest from a plurality of seismic sources;

estimating a first plurality of signal modes using a plurality of priors by applying sparse inversion to the blended seismic data;

selecting a first strongest signal mode from the first plurality of signal modes;

predicting first multi-source interference in the blended seismic data based at least in part on the first strongest signal mode;

separating the first strongest signal mode and the first multi-source interference from the blended seismic data, such that a first residual signal is left;

displaying a first image of the first residual signal;

based on the first image, identifying whether the first residual signal is deblended;

responsive to the first residual signal not being deblended, estimating a second plurality of signal modes using the plurality of priors by applying the sparse inversion to the first residual signal;

selecting a second strongest signal mode from the second plurality of signal modes;

predicting second multi-source interference in the blended seismic data based at least in part on the second strongest signal mode;

separating the second strongest signal mode and the second multi-source interference from the first residual signal, such that a second residual signal is left;

displaying a second image of the second residual signal;

based on the second image, identifying whether the second residual signal is deblended; and responsive to the second residual signal being deblended, estimating a coherent signal from the second residual signal by solving the sparse inversion.

2. The method of claim 1, further comprising generating an image representing the subsurface volume of interest based at least in part on the coherent signal.

3. The method of claim 1, wherein estimating the first plurality of signal modes includes using a sparsity inversion promoting transform that is multi-dimensional.

4. The method of claim 1, wherein the sparse inversion comprises at least one of exploiting a sparsity or low-rank structure of seismic data.

5. The method of claim 1, wherein a first prior of the plurality of priors is configured to increase a first sparsity of a first signal mode of the first plurality of signal modes, and wherein a second prior of the plurality of priors is configured to increase a second sparsity of a second signal mode of the first plurality of signal modes.

6. The method of claim 5, wherein the first signal mode comprises a direct arrival, and wherein the second signal mode comprises a reflection, refraction, a coherent noise component, or a combination thereof.

7. The method of claim 1, wherein the blended seismic data includes one or both of pressure motion measurements or particle motion measurements.

8. The method of claim 1, wherein the plurality of priors includes at least one of noise attenuation, timing information of the blended seismic data, or frequency bands in the blended seismic data.

9. The method of claim 1, wherein the plurality of priors includes velocity model data representing propagation characteristics through the subsurface volume.

10. The method of claim 9, wherein the plurality of priors includes one or both of a moveout correction or static correction.

11. The method of claim 1, further comprising, before identifying whether the first residual signal is deblended, separating a third strongest signal mode and third multi-source interference from the blended seismic data to form the first residual signal.

12. A computing system, comprising:

one or more processors; and a memory system comprising one or more non-transitory, computer-readable media storing instructions that, when executed by at least one of the one or more processors, cause the computing system to perform operations, the operations comprising:

acquiring blended seismic data representing a subsurface volume of interest from a plurality of seismic sources;

estimating a first plurality of signal modes using a plurality of priors by applying sparse inversion to the blended seismic data;

selecting a first strongest signal mode from the first plurality of signal modes;

predicting first multi-source interference in the blended seismic data based at least in part on the first strongest signal mode;

separating the first strongest signal mode and the first multi-source interference from the blended seismic data, such that a first residual signal is left;

displaying a first image of the first residual signal;

based on the first image, identifying whether the first residual signal is deblended;

responsive to the first residual signal not being deblended, estimating a second plurality of signal modes using the plurality of priors by applying the sparse inversion to the first residual signal;

selecting a second strongest signal mode from the second plurality of signal modes;

predicting second multi-source interference in the blended seismic data based at least in part on the second strongest signal mode;

separating the second strongest signal mode and the second multi-source interference from the first residual signal, such that a second residual signal is left;

displaying a second image of the second residual signal;

based on the second image, identifying whether the second residual signal is deblended; and responsive to the second residual signal being deblended, estimating a coherent signal from the second residual signal by solving the sparse inversion.

13. The computing system of claim 12, wherein the operations further comprise generating an image representing the subsurface volume of interest based at least in part on the coherent signal.

14. The computing system of claim 12, wherein a first prior of the plurality of priors is configured to increase a first sparsity of a first signal mode of the first plurality of signal modes, and wherein a second prior of the plurality of priors is configured to increase a second sparsity of a second signal mode of the first plurality of signal modes.

15. The computing system of claim 14, wherein the first signal mode comprises a direct arrival, and wherein the second signal mode comprises a reflection, refraction, a coherent noise component, or a combination thereof.

16. The computing system of claim 12, wherein the blended seismic data includes one or both of pressure motion measurements or particle motion measurements.

17. The computing system of claim 12, wherein the plurality of priors includes at least one of noise attenuation, timing information of the blended seismic data, or frequency bands in the blended seismic data.

18. The computing system of claim 17, wherein the plurality of priors includes one or both of a moveout correction or static correction.

19. A non-transitory, computer-readable medium storing instructions that, when executed by at least one processor of a computing system, cause the computing system to perform operations, the operations comprising:

acquiring blended seismic data representing a subsurface volume of interest from a plurality of seismic sources;

estimating a first plurality of signal modes using a plurality of priors by applying sparse inversion to the blended seismic data;

selecting a first strongest signal mode from the first plurality of signal modes;

predicting first multi-source interference in the blended seismic data based at least in part on the first strongest signal mode;

separating the first strongest signal mode and the first multi-source interference from the blended seismic data, such that a first residual signal is left;

displaying a first image of the first residual signal;

based on the first image, identifying whether the first residual signal is deblended;

responsive to the first residual signal not being deblended, estimating a second plurality of signal modes using the plurality of priors by applying the sparse inversion to the first residual signal;

selecting a second strongest signal mode from the second plurality of signal modes;

predicting second multi-source interference in the blended seismic data based at least in part on the second strongest signal mode;

separating the second strongest signal mode and the second multi-source interference from the first residual signal, such that a second residual signal is left;

displaying a second image of the second residual signal;

based on the second image, identifying whether the second residual signal is deblended; and responsive to the second residual signal being deblended, estimating a coherent signal from the second residual signal by solving the sparse inversion.

* * * * *